Dec. 29, 1964   R. U. GESSLER   3,163,554
PICTORIAL FILM AND PRESENTATION OF
VISUAL IMPRESSIONS THEREFROM
Filed April 17, 1959   2 Sheets-Sheet 1

INVENTOR.
ROBERT U. GESSLER
BY
Harry B. Keck
ATTORNEY

Dec. 29, 1964 R. U. GESSLER 3,163,554
PICTORIAL FILM AND PRESENTATION OF
VISUAL IMPRESSIONS THEREFROM
Filed April 17, 1959 2 Sheets-Sheet 2

INVENTOR.
ROBERT U. GESSLER
BY
Harry B. Keck
ATTORNEY

United States Patent Office 3,163,554
Patented Dec. 29, 1964

3,163,554
PICTORIAL FILM AND PRESENTATION OF
VISUAL IMPRESSIONS THEREFROM
Robert U. Gessler, Pittsburgh, Pa., assignor, by mesne assignments, to Harton S. Semple and Richard H. Semple, Jr., both of Pittsburgh, Pa.
Filed Apr. 17, 1959, Ser. No. 807,150
9 Claims. (Cl. 117—45)

The present invention relates to a novel film for use in visual presentations and to the presentation of visual impressions therefrom. More particularly, it relates to a novel film which is adapted for alternative viewing by transmitted light and by reflected light and to such alternative viewing.

Ordinary photographs, printed impressions, paintings and the like are usually viewed by reflected light. That is, the viewer observes light ray phenomena which are reflected from the surface of the visual presentation. An entirely different classification of visual presentation includes those representations usually photographic "transparencies," which are viewed by transmitted light. That is, the viewer observes light ray phenomena which originate behind the presentation during their transmittance through the presentation. In the usual form of photographic "transparencies," the same presentation may be viewed, albeit less distinctly, by reflected light. Where colored photographic "transparencies" are employed, the color fidelity, clarity and vividness is significantly less satisfactory when the presentation is viewed by reflected light.

The present invention provides a novel film which permits the presentation of a visual impression which has clarity when viewed by reflected light and which also possesses clarity when viewed by transmitted light.

The principal object of this invention is to provide a film to which visual presentations may be affixed for viewing alternatively by reflected light and by transmitted light.

A further object of this invention is to provide a film to which a portion of a complete visual presentation may be affixed on one surface for viewing by reflected light and to which the remaining portions of a visual presentation may be affixed to the opposite side so that the entire visual presentation may be viewed by transmitted light.

A further object of this invention is to provide a film to which photographic presentations or presentations achieved by other familiar printing processes (silk-screen, photolithography, letter-press and the like) may be affixed.

A still further object of this invention is to provide a film which possesses dimensional stability and wear-resistance.

Another object of this invention is to provide a film which permits the affixation thereto of multi-color impressions without requiring extremely accurate printing registry.

These and other objects and advantages of the present invention will be described in the following specification by reference to the accompanying drawings in which.

According to the present invention, I provide as a base for my film a sheet of transparent material to which a translucent coating is applied over each surface. The transparent surface may comprise any photographically pure material such as glass, clear plastics, especially cellulose acetate, cellulose nitrate, acrylates, styrene polymers, and the like. In the preferred embodiment of the invention, I employ thin sheets of polyethylene terephthalate which is commercially available under the trade-name Mylar. This material is preferred because of its toughness, dimensional fidelity, flexibility and photographic purity.

The translucent layers which are affixed to each side of the transparent sheet preferably comprise gel-forming suspensions of photographically pure plastic substances in which finely divided pigmenting materials are dispersed. The pigmenting materials preferably are white particles of suitable materials such as titanium dioxide, although other white pigmenting materials may be employed such as barium sulfate, zinc oxide and the like. The gel-forming plastic may be a vinyl chloride, vinyl acetate, acrylate, polystyrene, or any of the wide variety of photographically pure plastic gel-forming materials.

It may be desirable to affix a layer of a substance having absorbent properties for coloring materials over each translucent exposed surface. An albumin gel or a non-sensitive emulsion gel may be employed for this purpose, i.e., to improve adhesion of dyes, inks, oils, paints, pigments or other coloring materials employed for the visual presentation.

Figure 1:
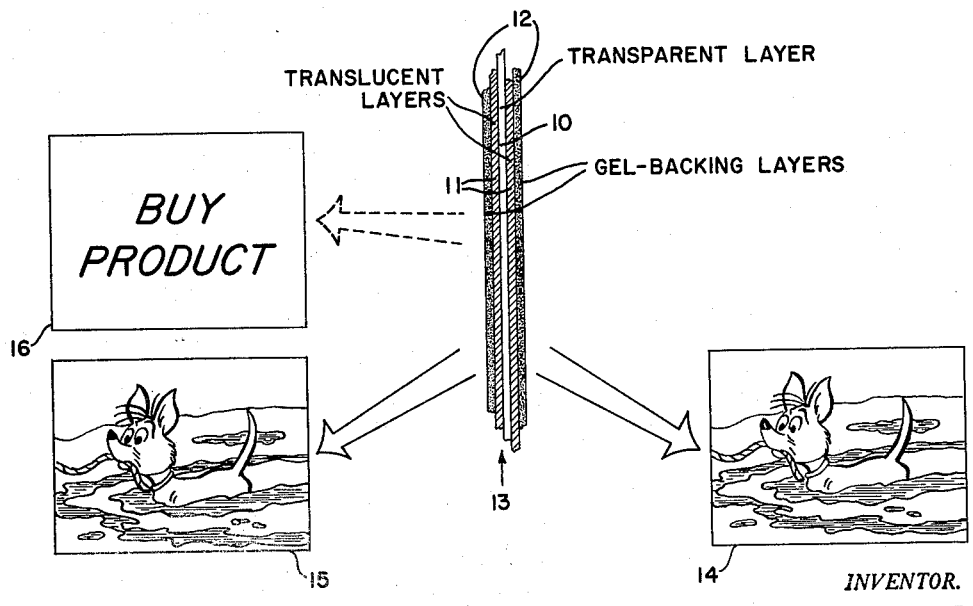
FIGURE 1 is a cross-section view of the film of this invention showing typical presentations which may be impressed thereon.

A cross-section through a film prepared as described is set forth in FIGURE 1 wherein a transparent sheet 10 is coated on each side with a translucent layer 11. If desired, a further absorbent layer 12 may be applied over one or both of the translucent layers 11. The assembled film is identified by the numeral 13.

Operation

The film 13 which is illustrated in FIGURE 1, may be put to practical use as will be described. A pictorial representation may be affixed over one outer surface thereof, as, for example the pictorial representation 14. This pictorial representation may be accomplished solely in one color or may be accomplished in more than one color. When the resulting film is viewed by reflected light, the entire pictorial presentation can be observed. When viewed by transmitted light, there is no change in the impression observed by the viewer.

For multicolor pictorial presentation, however, it is affixed to the film 13 in less than all of the requisite possible that the pictorial representation 14 may be affixed to the film 13 in less than all of the requisite colors or content for a complete visual impression. Accordingly, when viewed by reflected light, only those colors or that content which appear in the representation 14 are observed by the viewer. The remaining colors or content required for a complete visual impression may be affixed to the other side of the film as in the corresponding pictorial representation 15. The corresponding pictorial representation 15 need not be in itself a complete visual presentation, but instead may include merely the complementary portions which are not included in the presentation 14. When such a film is viewed by reflected light, only the pictorial presentation 14 is observed by the viewer. However, when the completed film is viewed by transmitted light, all of the elements of both presentations 14 and 15 are observed by the viewer who receives a complete impression.

For a specific example of the finished film, consider any series of four-color printing plates. Each plate includes only a portion of the lines and shadings required to produce a complete pictorial impression. Frequently several of the four-color printing plates bear little, if any resemblance alone to the ultimate pictorial presentation. Usually, one or more of the four-color plates is predominant in the final presentation. Should the usual black, yellow, blue and red plates be employed, it is possible, for example, to print the impression of the black color plate on the exposed surface presentation 14 and to print the yellow, red and blue plate impressions on the other surface of the film presentation 15. When a film is thus assembled and printed, only the black portion of the picture (against the pigmented exposed surface of the film) will be observed by the viewer through reflected light. However, when the film is viewed through transmitted light, the entire composite impression will be observed by the viewer. By alternately illuminating the front and the back of the film, the viewer will observe alternately the black-and-white impression and the full-color impression.

It is further possible to imprint an unrelated (but corresponding) presentation over the non-exposed surface as indicated by the presentation 16. The presentation may be used alone or together with a related presentation 15 so that the unrelated presentation 16 is observed by the viewer only when the film is interposed between the viewer and a suitable light source which generates the light phenomena which are transmitted through the film to the viewer.

I am aware that many films in the past have been employed for visual presentations through transmitted light phenomena. Such films have suffered from a defect known as "halation." "Halation" refers to the factors which permit the viewer to observe the direct light source as an area (or halo) of greater luminous intensity. Where the light source has been positioned near the center of the prior art films, bright illumination occurred over the center portions of the presentations whereas the border portions of the film have been relatively dark with resultant lack of vividness and clarity.

The halation problem has been attacked in the past by providing a translucent barrier between the light source and the pictorial impression in order to diffuse the light rays prior to their passage through the pictorial presentation. To the best of my knowledge, such so-called "anti-halation" films have employed a single pictorial presentation through which diffused light alone has passed.

According to the present invention, the light rays from a light source pass firstly through a pictorial presentation 15 and/or 16 and thereafter through a translucent layer 11 which diffuses the light rays which already correspond to the pictorial presentation 15 and/or 16. Thereafter the light rays, in a diffused condition, pass through a transparent sheet 10 which allows them to spread out before passing through a second translucent layer 11 for further diffusion. The completely diffused light rays which already correspond to the pictorial presentation 15 and/or 16 thereafter pass through a pictorial presentation 14 which is affixed to the exposed viewing surface. The light rays transmitted from the light source through the entire film 13 are observed by the viewer as a complete composite impression. Because of the high degree of diffusion thus achieved, the pictorial impressions 15 and/or 16 have a "softened" appearance which is aesthetically pleasing to the eye of the viewer. Further the high degree of diffusion results in the elimination of the halation problem and permits the illumination of such films by a minimum number of light sources which achieve uniformity of luminous intensity.

A further advantage of the diffusion achieved by the present film is the simplification of printing registry problems. It is a well-known problem in multi-color printing processes that each of the various color plates which are employed must be closely and carefully aligned (or "registered") with the previously applied impressions in order that the product will accurately reflect the desired impression. With the present film, the high degree of diffusion which is achieved eliminates the need for precision in registry of the pictorial impressions which are applied to the non-exposed surface and thus results in lowered printing costs. Further, because pictorial presentations may be affixed to both surfaces of the film, it is possible to reduce the number of times which the material must pass through printing processes, such as presses, since two impressions may be concurrently applied, one to each surface. The presence of the transparent sheet 10 prevents color bleeding from one surface to the other.

Figure 2:
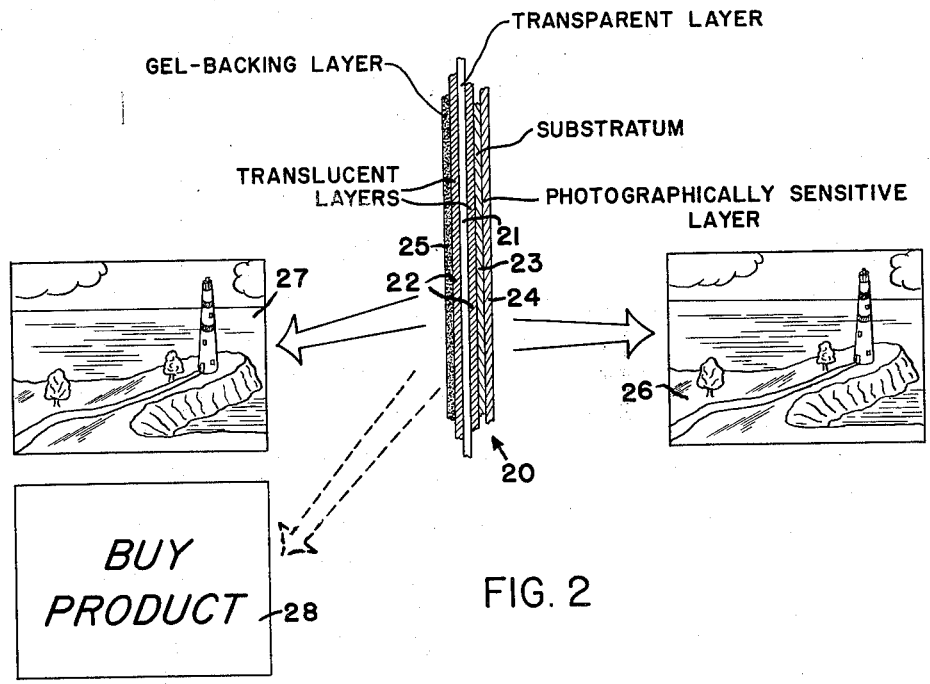
FIGURE 2 is a cross-section view of the film of this invention adapted to the presentation of photographic impressions showing typical presentations which may be impressed thereon.

The present film is also suitable for use in photographic processes as will be described by reference to FIGURE 2 which includes a cross-section view of a film according to this invention adapted to photographic purposes. As shown in FIGURE 2, a film 20 comprises a transparent sheet 21 coated with two translucent layers 22 as already described. A conventional photographic substratum layer 23 of albumin gel or other suitable material is affixed over one of the translucent layers 22 to provide a base for adhesion of a photographically sensitive gel emulsion layer 24.

A color absorbent gel layer 25 may be applied to the remaining translucent layer 22 to promote absorption of coloring materials.

A photographic image 26 now may be applied to the sensitive layer 24 to present an ordinary one-color (usually black-and-white) photographic impression over the exposed surface of the film 20. Appropriate coloring materials may be applied over the non-exposed surface, i.e., over the gel layer 25 to provide a presentation 27 of colors corresponding to the photographic image 26. The coloring materials may be dyes, inks, oils, paints, pigments or similar vivid substances.

When the film 20 is viewed by reflected light from the exposed surfaces, only the photographic image 26 is observed by the viewer. However, when the film 20 is viewed by transmitted light passing through the film 20 from left to right, both the presentation 27 and the photographic image 26 are observed by the viewer in proper registry to create a visual impression in full color.

As before, it is possible to provide in place of or in addition to the presentation 27, an unrelated, but corresponding presentation 28 on the non-exposed surface of the film 20.

I have found that optimum results are achieved by employing in the present film a transparent sheet having a uniform thickness from about 0.001 to 0.200 inch, preferably from about 0.002 to 0.075 inch. The minimum thickness of the transparent sheet is determined by the requisite mechanical strength of the product film and also by the requirement that some finite separation of the translucent layers of diffusing material is required to allow a spreading of the diffused light rays. Where excessively thick transparent sheets are employed, the resultant spreading of diffused light in transmittance between the two translucent layers in excessive with consequent loss of clarity and vividness of reproduction of the pictorial presentation on the non-exposed surface.

Figure 3:
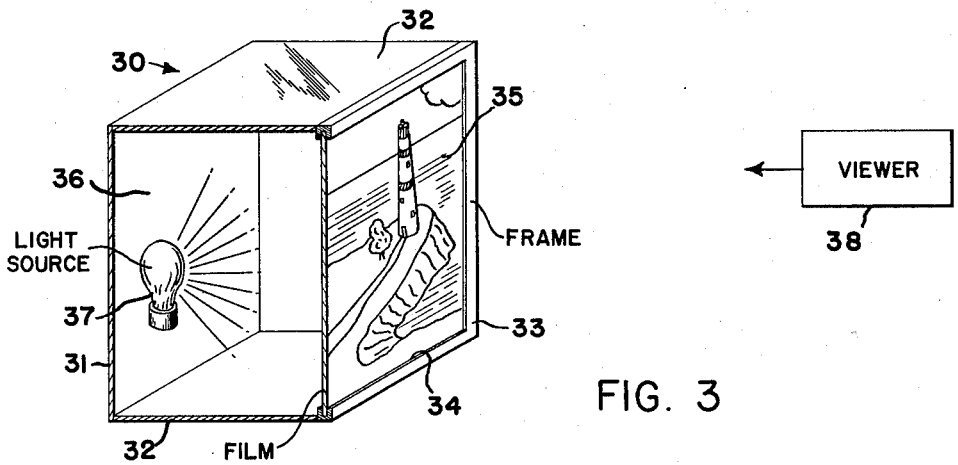
FIGURE 3 is a perspective illustration, partly in cross-section and partly schematic, showing a viewing installation according to the present invention.
Figure 4:
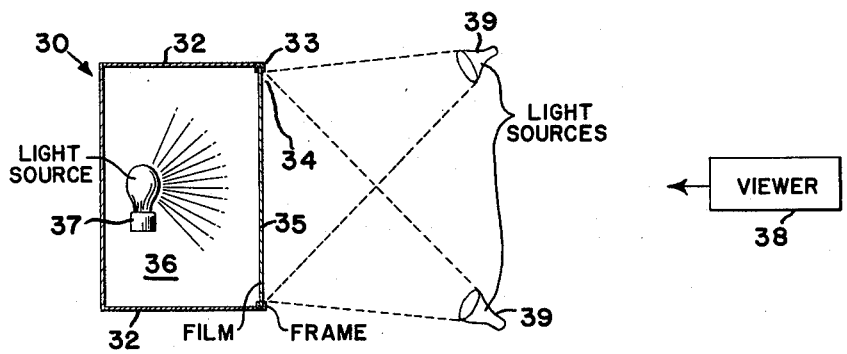
FIGURE 4 is an illustration, partly in cross-section and partly schematic, showing an alternative viewing installation according to the present invention.

Suitable installations for viewing the film of this invention are illustrated in FIGURES 3 and 4. As shown in FIGURES 3 and 4, a shadow-box 30 comprises a back wall 31, side walls 32 and a front wall 33 having an opening 34 into which a film 35 according to this invention may be fastened along its edges. The assembled shadow-box 30 forms an enclosed chamber 36 in which a light source 37 is provided. A viewer 38 positioned outside the shadow-box 30, may observe only the exposed presentation of the film 35 so long as the light source 37 is not generating illumination. However, when the light source 37 generates illumination in the enclosed chamber 36, light rays pass through the film 35 to provide a complete pictorial presentation of the entire film 35 to the viewer 38.

If desired, as shown in FIGURE 4, an external light source 39 is provided to illuminate the exposed surface of the film 35 when the light source 37 is not generating illumination. The external light source 39 provides assured illumination for reflection from the exposed surface of the film 35. When the film is to be viewed by transmitted light, the light source 37 is energized and the light source 39 is extinguished.

And now, according to the provisions of the patent statutes, I have described the present invention and illustrated the best mode of employment; however, I desire to have it understood that, within the scope of the appended claims, this invention may be employed otherwise than as specifically illustrated and described.

I claim:

1. A film for direct viewing alternatively by transmitted light and by reflected light comprising a transparent sheet having a translucent coating on each surface thereof and an image on one of said translucent coatings.

2. The film of claim 1 wherein the said image is photographically reproduced on said one of said translucent coatings.

3. The film of claim 1 wherein said image is printed on said one of said translucent coatings.

4. The film of claim 1 wherein the said image is applied to one of said translucent coatings and coloring matter corresponding to the said image is applied to the other of said translucent coatings.

5. The film of claim 1 wherein a first image is applied on one of said translucent coatings and a second image, different from but corresponding to the said first image, is applied on the other of said translucent coatings.

6. The film of claim 1 wherein a colored image is applied on one of said translucent coatings and a second image, corresponding to said first image but in different colors, is applied to the other of said translucent coatings.

7. The film of claim 1 wherein said transparent sheet has a thickness from 0.001 to 0.200 inch.

8. The film of claim 7 wherein said transparent sheet comprises polyethylene terephthalate.

9. The process of preparing a film for direct viewing alternatively by transmitted light and by reflected light which comprises selecting a film comprising a transparent sheet having a first translucent coating on one side thereof and a second translucent coating on the other side thereof, a photographically sensitive coating affixed to said film in outboard relation to one of said translucent coatings, reproducing a photographic image on said photographically sensitive coating, and affixing in outboard relation to the other translucent coating coloring matter corresponding to said photographic image.

References Cited in the file of this patent

UNITED STATES PATENTS

| | | |
|---|---|---|
| 594,655 | Schumacher | Nov. 30, 1897 |
| 804,038 | Pifer | Nov. 7, 1905 |
| 804,039 | Pifer | Nov. 7, 1905 |
| 1,411,439 | Keller | Apr. 4, 1922 |
| 1,470,468 | Neville | Oct. 9, 1923 |
| 1,630,916 | Wittenberg | May 31, 1927 |
| 1,880,202 | Hodgkin | Oct. 4, 1932 |
| 1,881,417 | Hodgkin | Oct. 4, 1932 |
| 1,899,962 | Higginbotham | Mar. 7, 1933 |
| 1,990,825 | Hodgkin | Feb. 12, 1935 |
| 2,232,032 | Kroner | Feb. 18, 1941 |
| 2,491,023 | Alles et al. | Dec. 13, 1949 |
| 3,062,649 | Salminen et al. | Nov. 6, 1962 |

FOREIGN PATENTS

| | | |
|---|---|---|
| 389,808 | Great Britain | June 19, 1931 |
| 201,861 | Australia | May 2, 1956 |